United States Patent
Ueno

(10) Patent No.: US 6,523,794 B2
(45) Date of Patent: *Feb. 25, 2003

(54) SUPPORTING ELEMENT FOR INSTRUMENTS OR SPEAKERS

(76) Inventor: Yasunaga Ueno, 507-4, Katsubecho, Moriyama-shi, Shiga-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/768,060

(22) Filed: Jan. 24, 2001

(65) Prior Publication Data

US 2001/0025907 A1 Oct. 4, 2001

Related U.S. Application Data

(63) Continuation of application No. 09/172,005, filed on Oct. 14, 1998, now Pat. No. 6,179,257.

(30) Foreign Application Priority Data

Dec. 30, 1997 (JP) ............................................. 9-367946

(51) Int. Cl.[7] ............................................... F16M 11/20
(52) U.S. Cl. ...................... 248/188.1; 248/638; 43/638; 16/30
(58) Field of Search .............................. 248/188.1, 638, 248/618, 580; 43/638; 16/30

(56) References Cited

U.S. PATENT DOCUMENTS

| | | |
|---|---|---|
| 172,310 A | 1/1876 | Guidlersleeve et al. |
| 997,842 A | 7/1911 | Metzroth |
| 1,131,487 A | 3/1915 | Dodd |
| 1,533,210 A | 4/1925 | Radu |
| 2,068,996 A | 1/1937 | Smith |
| 2,421,549 A | 6/1947 | Dillon |
| 2,631,330 A | 3/1953 | Becker |
| 4,251,045 A | 2/1981 | Meyerle |
| 5,682,724 A * | 11/1997 | Randjelovic .............. 52/403.1 |
| 6,179,257 B1 * | 1/2001 | Ueno ....................... 248/188.1 |

FOREIGN PATENT DOCUMENTS

| | | | |
|---|---|---|---|
| CH | 656295 | * | 6/1986 |
| DE | 2259729 | | 12/1972 |
| FR | 2642285 | * | 1/1989 |
| GB | 2267638 A | | 12/1993 |
| JP | 54137321 | | 10/1979 |
| JP | 58121101 | | 7/1983 |
| JP | 59002201 | | 1/1984 |
| JP | 0210434 | | 9/1988 |
| JP | 1153793 | | 10/1989 |
| JP | 07168559 | | 7/1995 |
| WO | WO 91/00682 | | 1/1991 |

OTHER PUBLICATIONS

European Search Report dated Dec. 18, 2000.

* cited by examiner

*Primary Examiner*—Kimberly Wood
(74) *Attorney, Agent, or Firm*—Arent Fox Kintner Plotkin & Kahn PLLC

(57) ABSTRACT

Between the base plate and the instrument are placed a bridge frame with a supporting point formed on its upper surface to support the instrument and a load-bearing section made with elastically deformable spring material having arc-shaped legs extending from the bridge frame toward the direction opposite to the instrument, while keeping a certain separation in between. Thereby, a weight supporting part that contacts with the bottom end surface of the instrument over a comparatively narrow area in a plane touch, or more preferably, in a point touch or in a line touch, and an absorbing part that absorbs vibrations transmitted from the instrument are made to coexist. Making the legs of the load-bearing section operate as an absorbing part to absorb vibrations not only in the horizontal direction but also in the vertical direction enhances the function of the supporting element to modulate vibrations to an even greater extent.

2 Claims, 9 Drawing Sheets

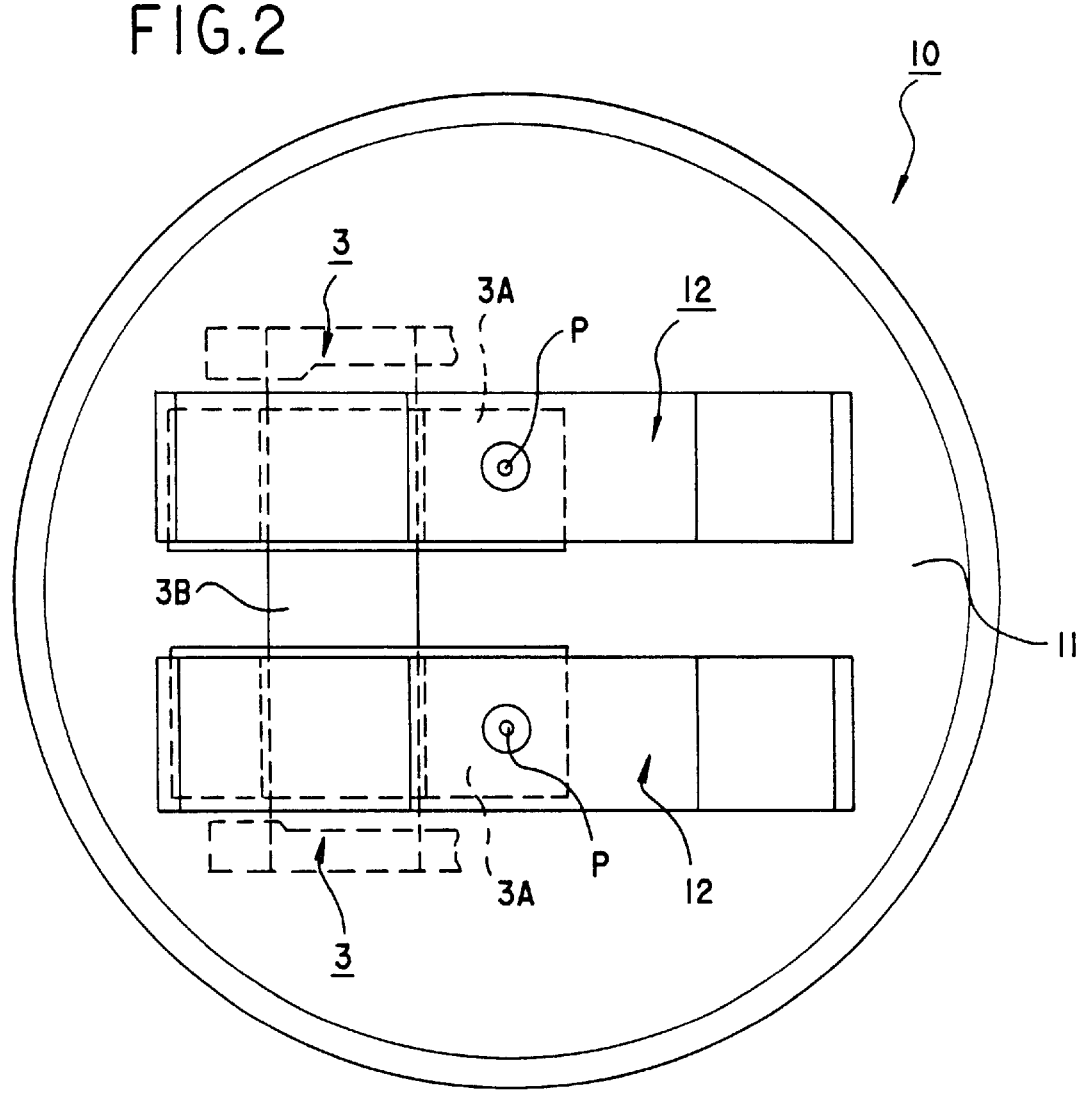

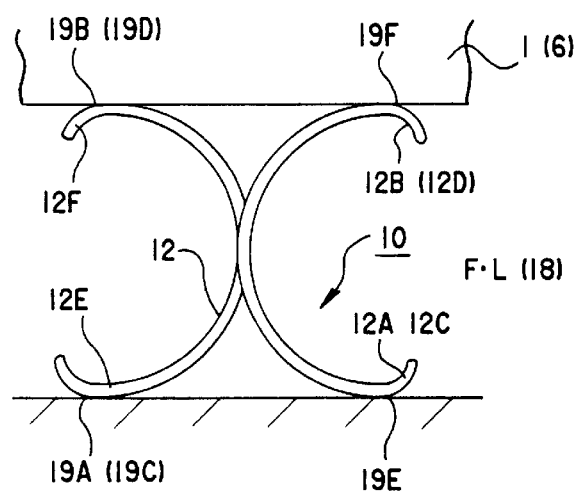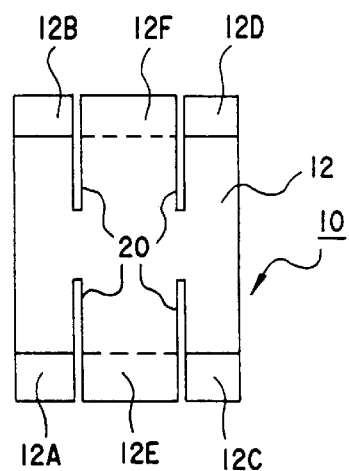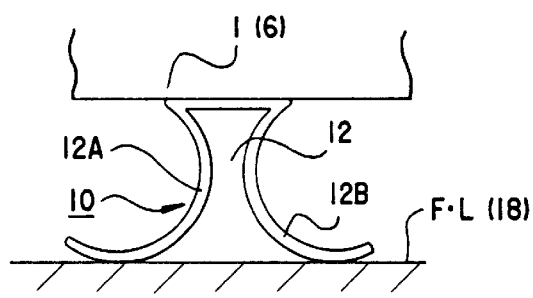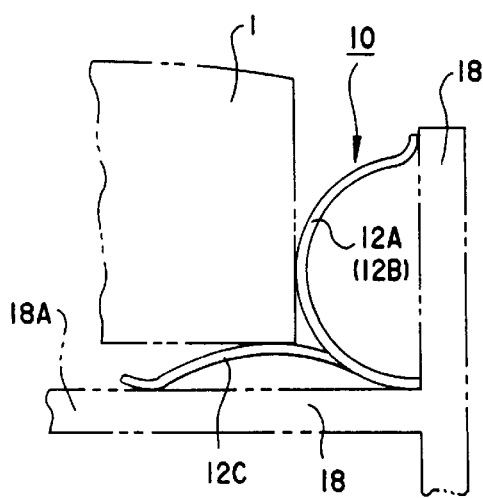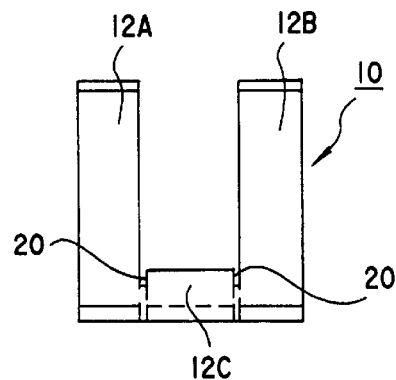

SUPPORTING ELEMENT FOR INSTRUMENTS OR SPEAKERS

This is a Continuation of application Ser. No. 09/172,005 filed Oct. 14, 1998, now U.S. Pat. No. 6,179,257.

BACKGROUND OF THE INVENTION

1. Field of the Invention

This invention relates to a supporting element for instruments or speakers, and in particular relates to improvement of a supporting element for the purpose of giving such instruments as piano, organ, harpsichord, marimba, drum set, koto, harmonica with keyboard, and guitar, or speakers freedom to vibrate along the vertical and horizontal directions.

2. Description of Related Art

In order to reduce, as much as possible, the distortion of the sound vibrations generated from such instruments as piano, organ, harpsichord, marimba, drum set, koto, harmonica with keyboard, and guitar, or speakers, and at the same time, to create a good acoustic space, the supporting conditions which do not prevent the freedom of vibrations when being played or used should be secured.

As an example, the supporting conditions will be described for a grand piano (1) for concert hall illustrated in FIG. 13. Mounted onto the bottom end of the leg (2) are a caster (3) that makes it easy for the piano to move in the hall and a braking means (4) for positioning and fixing thereof. Between the center O1 of the wheel (3A) of the caster (3) and the axial center O2 of the leg (2), a certain eccentric distance e is set to facilitate changing the direction of rotation of the wheel (3A).

As a result, the vertical component force F1 that corresponds to the weight of the piano (1) and the horizontal component force F2 that is parallel to the floor (F.L) are exerted on the leg (2). When the horizontal component force F2 is exerted on the leg (2), a bending moment M is produced on the main body of the piano, particularly, on the leg (2), owing to the existence of the eccentric distance e.

When the bending moment is applied on the leg (2), the grand piano (1), when being played, is prevented from freely vibrating in the vertical and horizontal directions. As a result, distortions are to be generated in the waveforms of the sound vibration produced from the main body of the grand piano (1). When the waveforms of the sound vibration are distorted, the direction of sound waves and the maintenance of sound quality should, naturally, be affected badly, and expected effects of performance cannot be obtained in spite of the greatest efforts of a performer and a tuning specialist.

On the other hand, the speaker (6) illustrated in FIG. 14 is generally placed and used on the floor (F.L) or on a frame stand, which is not shown. Then, the bottom surface (7) of the speaker (6) comes in close contact, in a plane touch, with the floor (F.L) or with the top surface of the frame stand. Therefore, since the free vibration both in the vertical and horizontal directions is restricted, the sound waves produced by the main body of the speaker (6) are distorted and transmitted to the air as they are. As a result, differences in the direction, the amplitude, or the time period of sound waves are produced between the sound vibrations directly transmitted from the speaker (6) to the air and those sound vibrations transmitted by way of the floor (F.L) or the frame stand to the air. Hence, close reproduction of the sound quality becomes impossible.

In order to solve the above-mentioned problem, there are some methods attempted in the case of the grand piano (1) illustrated in FIG. 13. Among them are the followings: as a positioning and fixing element for the piano main body, a frame stand of saucer type (the figure omitted) made of synthetic rubber or wood is placed between the wheel (3A) of a caster (3) and the floor (F.L); secondly, the moving direction of the wheel (3A) along the floor (F.L), that is, the acting direction of the horizontal component force F2 produced by the weight W, is made either parallel or perpendicular to the longitudinal direction of the sounding board or rod (the figures of both omitted) that is installed in the piano main body.

In any case of the above-mentioned weight supporting systems, however, the fact that there is an eccentric distance e between the center O1 of the wheel shaft (3B) of a caster (3) and the center O2 of the leg remains unchanged. Therefore, it is impossible to eliminate the influence of the bending moment M that is produced by the horizontal component force F2 completely.

It follows that there is a considerable phase difference between the sound waves transmitted from the main body of the grand piano (1) through the air to the space and those sound waves transmitted through the leg (2), the caster (3), and the floor (F.L) to the space. Especially on the side of the leg (2), the sound waves are transmitted to the floor (F.L) by way of the leg (2) and the wheel (3A) of the caster (3) adversely affected by the bending moment M. Accordingly the disturbance of waveforms of sound vibration becomes more remarkable. Thus, in spite of the various countermeasures mentioned above, the direction of sound transmission and the improvement of sound quality are prohibited to a great extent.

Then, the wheel (3A) of a caster (3) comes in close contact with the floor (F.L) over a comparatively narrow area. As a result, the weight W exerted on a unit area of the floor (F.L) becomes large, the vibrations are more easily transmitted to the floor (F.L), and the waveforms of sound vibration are disturbed all the more. Furthermore, since a large weight W is exerted on the floor (F.L) by way of a caster (3), the floor (F.L) may be damaged or hollowed.

On the other hand, in the case of the speaker (6) illustrated in FIG. 14, the disturbance of waveforms of sound vibration caused by the horizontal component force F2 and the bending moment M, as seen with the above-mentioned grand piano, is not the major problem, because there is no caster between the bottom end of the speaker (6) and the floor (F.L). However, since the whole area of the bottom end (7) of the speaker (6) closely touches the floor (F.L), the weight W of the speaker (6) is spread over and conveyed to the floor (F.L) as divided weights. As a result, the free vibrations of the speaker (6) in the vertical and horizontal directions are restrained as in the case of grand piano (1), and a resounding phenomenon of the floor takes place.

To solve this problem in a conventional manner, a supporting material such as brick, concrete block, and wood material is placed between the bottom end surface (7) of the speaker (6) and the floor (F.L) or the frame stand supporting the speaker (6), trying to restrain the transmission of vibrations to the floor and thereby to reduce the disturbance of waveforms of sound vibration. Such a weight supporting system, however, did not give sufficient damping effects and the risk of secondary troubles such as floor resounding to take place was not completely removed.

To solve such a problem, a speaker-supporting element illustrated in FIG. 15 is on sale. This speaker-supporting element forms a one-point support system, wherein a columnar pedestal (21) having a flat ball-receiving surface (22A) is placed on the floor (F.L), then, under this condition, a steel ball (20) is put on the ball-receiving surface (22A), and furthermore, a columnar pedestal (21) having a semispherical ball-receiving surface is covered on the steel ball. Between the ball-receiving surfaces (21A) (22A) vertically placed face to face turns and moves the steel ball (20), and thereby the vibrations in the horizontal direction are damped to a considerable extent. However, this speaker-supporting element can hardly give an effect in damping the vibrations in the vertical direction transmitted from the speaker (6), because the pedestals (21) (22) and the steel ball (20) are made of rigid material and the vertical movement of the steel ball (20) is substantially prohibited due to its construction. Besides, on the flat ball-receiving surface (22A) turns and moves the steel ball (20) freely along the horizontal direction, and thus, a difference of position between upper and lower pedestals (21) (22) is liable to arise while the supporting element is attached to the bottom surface of the speaker (6). As a result, the stable positioning and supporting of the speaker (6) are prevented.

Taking these present circumstances into account, the inventor repeated a series of systematic experiments to investigate the characteristics of the vibrations transmitted from an instrument or a speaker to a supporting element. The supporting element thus invented from the results is presented as Japanese Patent No. 2593404. The use of this type of supporting element can actually reduce the differences in direction, amplitude, or period of sound waves between the vibrations directly transmitted from an instrument or a speaker to the air and those vibrations transmitted by way of the floor or the frame stand to the air. Though, the inventor also continued thereafter to do additional experiments on the damping characteristics that a supporting element for instruments or speakers should have. As a result, the inventor has found the following fact: the quality of sounds produced by an instrument or a speaker can be reproduced almost perfectly, if the main part of the supporting element is made with spring materials and, at the same time, the weight-supporting part in a point touch or line touch and the vibration-absorbing part, both of which make use of spring elasticity, are placed together between the instrument or the speaker and the base plate or the floor.

SUMMARY OF THE INVENTION

Based on this fact, this invention presents a supporting element for instruments or speakers characterized in that between an instrument or a speaker and a base plate or the floor are placed a weight supporting part brought in contact with the bottom surface of the instrument or the speaker in a plane touch over a comparatively narrow area, or more preferably in a point or line touch, and an absorbing part to absorb vibrations transmitted from the instrument or the speaker, wherein a bridge frame with a supporting point formed on its top surface to support the instrument or the speaker and a load-bearing section made with elastically deformable spring materials with arc-shaped legs extending from this bridge frame toward the direction opposite to the instrument or the speaker are set between the base plate or the floor and the instrument or the speaker mentioned above, while keeping a certain separation in between.

The invention also presents a supporting element for instruments or speakers characterized in that between an instrument or a speaker and a base plate or the floor are placed a weight supporting part brought in contact with the bottom surface of the instrument or the speaker in a plane touch over a comparatively narrow area, or more preferably in a point or line touch, and an absorbing part to absorb vibrations transmitted from the instrument or the speaker, wherein a bridge frame with a supporting point formed on its top surface to support the instrument or the speaker, a load-bearing section made with elastically deformable spring material with arc-shaped legs extending from this bridge frame toward the direction opposite to the instrument or the speaker, a steel ball rotatably placed on a receiving surface of semi-spherical concave hollow formed on the top surface of the load-bearing section, and a receiving part on the side of the instrument or the speaker with a semi-spherical receiving surface formed on its bottom end to hold this steel ball from upside are set between the base plate or the floor and the instrument or the speaker mentioned above, while keeping a certain separation in between.

The invention also presents a supporting element for instruments or speakers characterized in that between an instrument or a speaker and a base plate or the floor are placed a weight supporting part brought in contact with the bottom surface of the instrument or the speaker in a plane touch over a comparatively narrow area, or more preferably in a point or line touch, and an absorbing part to absorb vibrations transmitted from the instrument or the speaker, wherein a bridge frame forming on top a surface to fix a coil spring mentioned after, a load-bearing section made with elastically deformable spring material with arc-shaped legs extending from this bridge frame toward the direction opposite to the instrument or the speaker, and a coil spring of compression type with the top end thereof forming a receiving surface for the instrument or the speaker and the bottom end thereof being fixed to the bridge frame are set between the base plate or the floor and the instrument or the speaker mentioned above, while keeping a certain separation in between.

The casters attached to the bottom end of an instrument such as grand piano or a large-sized speaker are lifted up and supported by the aforementioned supporting element at a weight supporting point formed thereon and the main body of the instrument or the speaker is separated from the floor for a certain distance. Thereby, the influence of the bending moment is minimized. By use of a supporting element that has a weight supporting part with comparatively narrow contact area, close to a point or a line, the instrument or the speaker is allowed to vibrate freely in the vertical and horizontal directions. As a result, the vibrations transmitted to the floor from the main body of the instrument or the speaker are damped and the disturbance of waveforms of sound vibration is minimized.

Namely, by placing a supporting structure of a point touch type or a line touch type between the bottom end surface of an instrument or a speaker and the primary load-bearing section, the disturbance of waveforms of sound vibration transmitted from the instrument or the speaker is minimized.

BRIEF DESCRIPTION OF THE DRAWINGS

FIG. 2 is a plan view of the supporting element sectioned along the line II—II of FIG. 1;

FIG. 8A is a front elevation view of the supporting element developed for speakers, instruments placed directly on the floor or instruments used as being placed on the frame stand;

FIG. 8B is a side elevation view of the supporting element;

FIG. 9 is a front elevation view of the supporting element developed for speakers, instruments placed directly on the floor or instruments used as being placed on the frame stand;

FIG. 10A is a front elevation view of the supporting element developed for instruments used as being placed on the frame stand;

FIG. 10B is a side elevation view of the supporting element;

Figure 13:
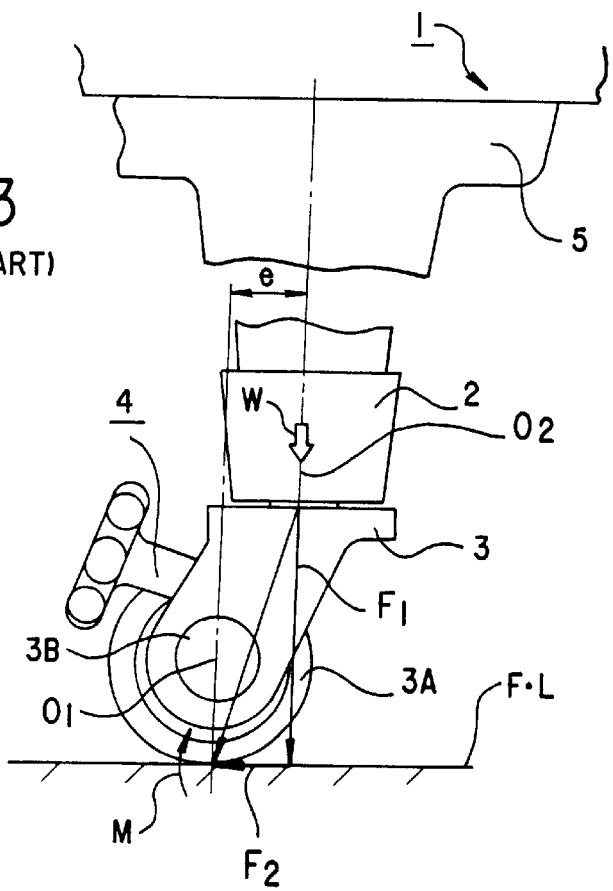
FIG. 13 is a front elevation view showing the structure of the leg of a large-sized grand piano for concert hall use.
Figure 14:
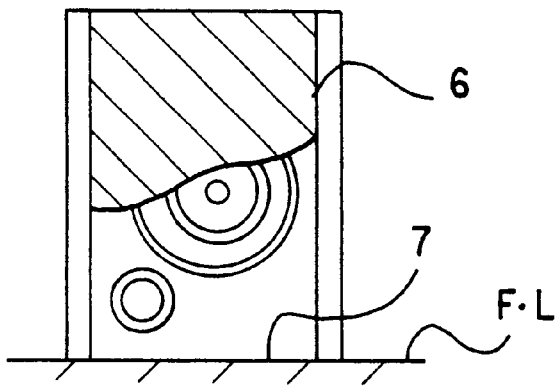
FIG. 14 is a front elevation view showing a conventional example of an installed speaker.
Figure 15:
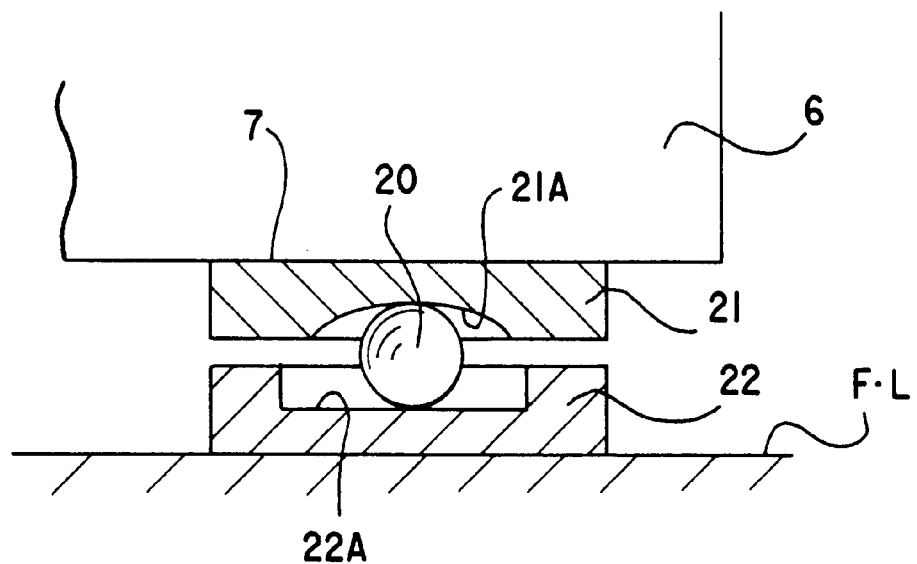
FIG. 15 is a partial longitudinal cross-sectional view showing a conventional example of the supporting elements for speakers.

Hereinafter, with reference to FIG. 1 through FIG. 12, some embodiments of the invention will be described. In the following descriptions, the structural parts identical to those in FIG. 13 to FIG. 15, which show the conventional art of technology, are, as a rule, indicated by the same reference numbers and the same symbols, and the description is omitted concerning duplicate items.

Figure 1:
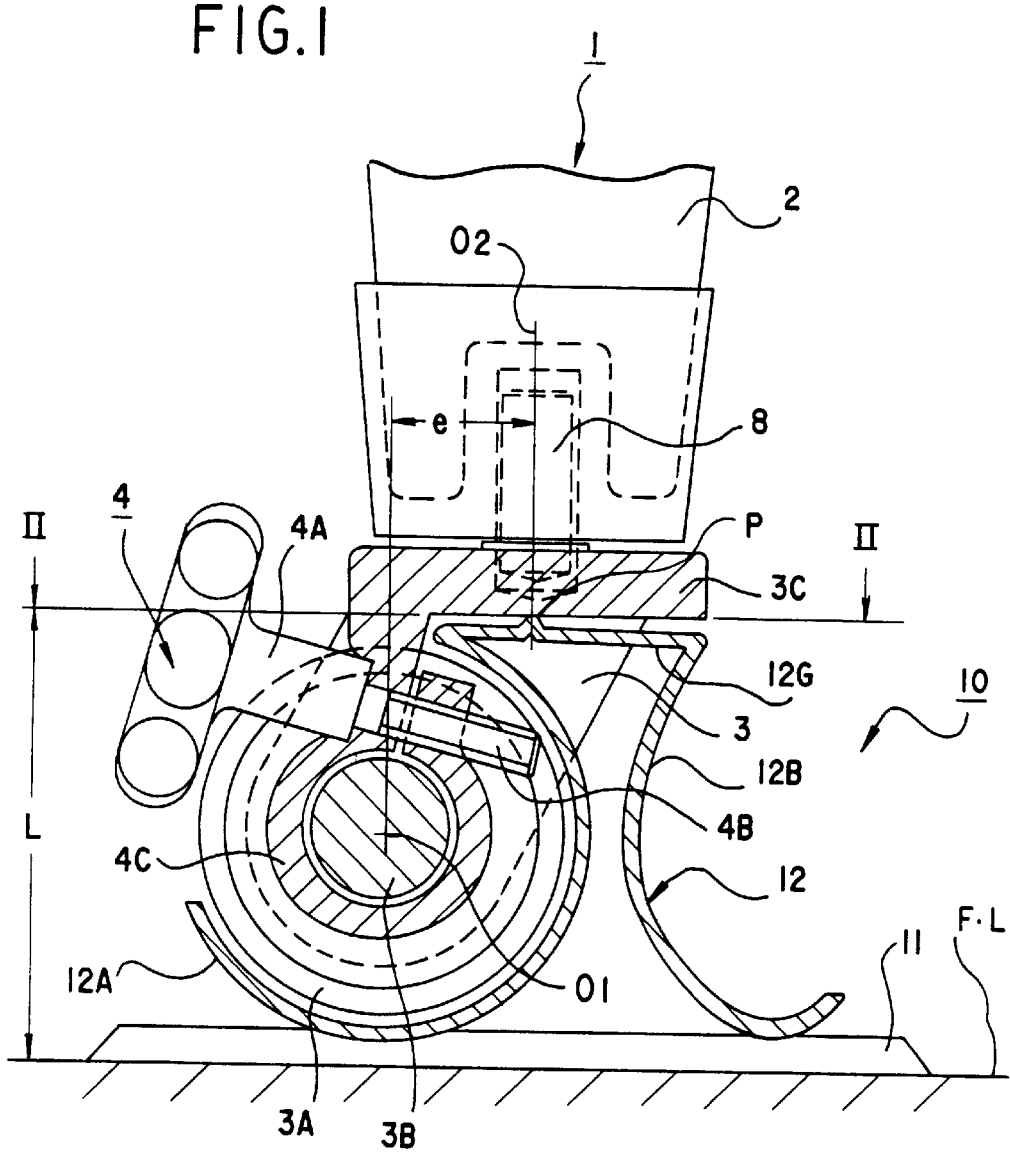
FIG. 1 is a partial longitudinal cross-sectional view showing an embodiment of the supporting element in accordance with the invention.

FIG. 1 and FIG. 2 show a supporting element of a point support type designed for a large grand piano (1) for concert hall use. This supporting element (10) is comprised of a load-bearing section (12) made with elastically deformable board spring having a point supporting portion P on its top to lift up and support the grand piano while keeping a certain separation L from the floor (FL). The supporting element (10) forms the supporting structure to lift up a grand piano (1) wherein the supporting portion P is brought into point contact with the back surface of the top board of the caster (3) attached to the bottom end of the legs (2) of the grand piano (1) and wherein load-bearing sections made with board spring that extend to the right and left respectively with the supporting portion P in the middle are bent downward at each shoulder, the bent portions being curved in an arc shape at a certain radius of curvature.

The load-bearing section (12) is comprised of a pair of legs (12A) (12B) which are set on the base plate (11) and an approximately level bridge frame (12G) which bridges the top ends of the legs (12A) (12B). On the upper surface of the bridge frame (12G), a supporting portion P is formed nearly in the middle or more preferably, in the position in agreement with the center O2 of the bottom surface of the leg (2) of the piano (1). The legs (12A) (12B) are arc shaped pieces of material, wherein the inner sides thereof (the side facing the counterpart) are curved convexly and the radii of curvature thereof are different with each other between the legs (12A) (12B) as will be mentioned later.

When the weight W of the grand piano (1) is loaded on a point supporting portion, the board spring used for a load-bearing section deforms elastically to produce an equilibrium state with this weight, and thus, lifts up and supports the grand piano (1) in a point support condition to allow free vibration.

Spring materials used for a load-bearing section (12) are generally made of elastically deformable metals such as spring steel and stainless steel. In addition to the metallic materials, fiber-reinforced resins, plastics, wooden materials, or composite structures of these materials can also be used, only if the load-bearing section made thereof can deform elastically to produce an equilibrium state with the weight W of the instrument (1) or the speaker (6) and can lift up and support the grand piano (1) or speaker (6) in a point support or in a line support condition to allow free vibration, when the weight is loaded on the point supporting portion P or on the line supporting portion, As above-mentioned spring material, either board spring or rod spring is properly selected for use, depending on the kind and weight, and the form and size of the instrument (1) or the speaker (6).

Dimensions, strength characteristics and spring constant of the spring material are set considering the weight W of the instrument (1) or the speaker (6) supported by the supporting element (10) and the characteristics of sound vibrations produced therefrom. Namely, the dimensions, strength characteristics and spring constant of the spring material are set in such a manner that the body of the supporting element (10) can deform elastically in response to the weight W of the instrument (1) or the speaker (6) and can lift up and support the instrument (1) or the speaker (6) on a point supporting portion or a line supporting portion P formed on the top end thereof while keeping a certain separation L from the floor (F.L), and that the legs (12A) (12B) can work as an absorbing part of vibrations transmitted from the grand piano (1) to the point supporting portion or line supporting portion P. Thereby, the instrument (1) or the speaker (6) is brought into a state wherein the instrument (1) or the speaker (6) can vibrate freely along the vertical direction as well as along the back and forth, and right and left directions under above-mentioned supporting conditions.

The form and dimensions of the supporting element (10) are adjusted to the form and dimensions of the bottom end of the instrument (1) or the speaker (6) which the the supporting element (10) should lift up and support. The supporting element (10) illustrated in FIGS. 1 and 2 forms a structure to prevent resonance of a grand piano (1) wherein one leg (12A) of the main body of supporting element (10) is curved in an arc shape along the peripheral surface of the wheel shaft (3B) and at the same time the other leg (12B) is curved in an arc shape in the opposite direction, the radii of curvature thereof being different from each other, wherein a set of two load-bearing sections (12A) (12B) have an unsymmetrical structure right and left with respect to the point supporting portion P, namely the point on which the load acts, and wherein the spring constants of both legs (12A) (12B) are made different from each other.

On the other hand, when a resonant phenomenon is not likely to happen to an instrument (1) or a speaker (6) that is lifted up and supported by a supporting element (10) in a point touch or line touch condition, the structure of the legs (12A) (12B) can be made symmetrical back and forth, and right and left with respect to the point supporting portion P, thereby making it possible to simplify the structure to reduce man-hours and costs required.

The supporting element (10) illustrated in FIGS. 1 and 2 has a metallic base plate (11) attached to the bottom ends of the legs (12A) (12B) to facilitate mounting thereof onto the legs (2) of a grand piano (1) and also to prevent damage to the floor (F.L) caused by loading of a large weight. The method of attaching the base plate (11) can be selected optionally from among jointing means known to public such as bonding, welding, and fitting-in.

By fitting the axle (8) into the bottom end of the leg (2) of a grand piano (1), the caster (3) is supported in such a manner that it can turn around the axial center O2 of the leg (2) while keeping an eccentric distance e between the the axial center O2 of the leg (2) and the center of the wheel shaft (3B) O1, which will be mentioned later. The caster (3) is comprised of a wheel (3A), a wheel shaft (3B), and a bearing part (3C) with a shape of inverse U holding the wheel shaft (3B) and rotatably supporting the wheel (3A). The above-mentioned axle (8) is fixed on the upper surface of this bearing part (3C) as a means for the caster (3) to be attached to the leg (2).

The caster (3) of a large grand piano (1) for concert hall use may have a braking means (4) to fix the position firmly when the piano (1) is played. This braking means is comprised of two parts; one is a manual tightening means equipped with a male screw (4B) on the tip side and a revolving handle to tighten or loosen the male screw (4B) on the base side; and the other is a braking ring band (4C) which holds the wheel shaft (3B) of the caster (3), contracts its diameter when the male screw (4B) is tightened to restrain the wheel (3A) from turning, and expands its diameter when the male screw (4B) is loosened to recover the initial state to enable the wheel (3A) to turn.

Whether the above-mentioned braking means (4) is attached or not, the supporting element (10) has a load supporting structure for a grand piano placed between the bottom end of the leg (2) of the grand piano (1) and the top end of the load-bearing section (12), or more precisely, between the back surface of the top board of the bearing part (3C) with a shape of inverse U attached to the bottom end of the legs (2) of the grand piano (1) and the top end of the load-bearing section (12), being in a plane touch over a comparatively narrow area, or more preferably, in a point touch or in a line touch.

When the above-mentioned load supporting structure (12) in a point touch or in a line touch is hard to be formed owing to structural limitations of the leg (2), the dimensions and form of the supporting element (10) are chosen so that a plane touch of as small an area as possible can be accomplished.

In the supporting element (10) for a large grand piano (1) illustrated in FIGS. 1 and 2, the wheel (3A) of the caster (3) has a structure divided into two parts along the length of the shaft (3B) thereof, and in between is mounted a braking means (4). Therefore, a set of two load-bearing sections (12) made with board spring of stainless steel are placed face to face, at right and left with a braking means (4) in between as shown in FIG. 2. As a result, a space for inserting the braking means (4) is secured, and the point on which the weight W acts, in other words, the point-supporting spot P for the grand piano (1), is formed on the top end surface of each load-bearing section (12), (12).

Figure 3A:
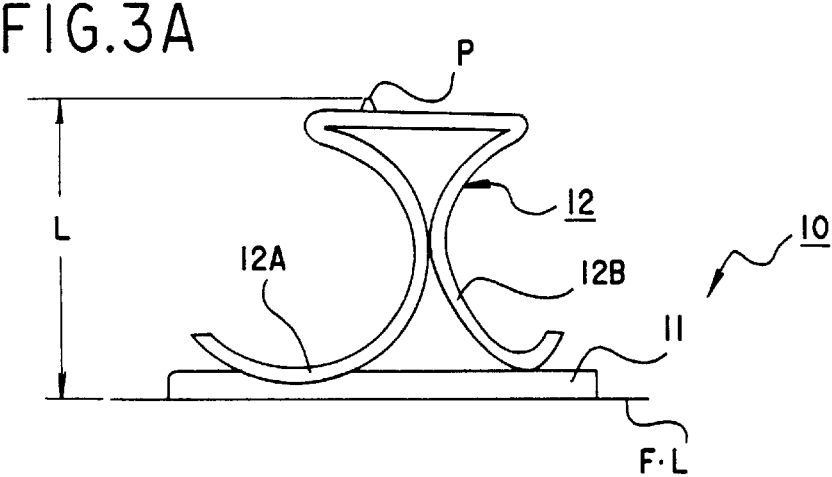
FIG. 3A is a front elevation view of the supporting element developed mainly for grand piano.
Figure 3B:
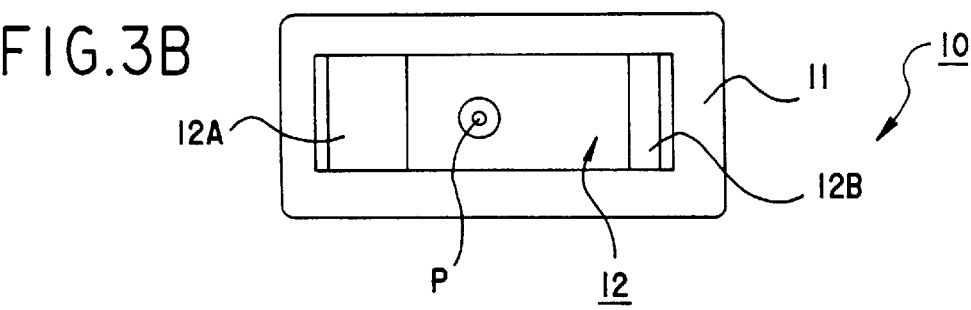
FIG. 3B is a plan view of the supporting element.

The supporting element (10) illustrated in FIG. 3, on the contrary, has been developed for a comparatively small grand piano (1) or an upright piano for home use. The bottom end of one leg (12A) of the load-bearing section (12) is welded onto the upper surface of the base plate (11) and the bottom end of the other leg (12B) is made free to touch and slide along the upper surface of the base plate (11). And a point-supporting spot P is formed on the bridge frame of the load-bearing section (12) and, at the same time, the legs (12A) (12B) form an absorbing part which absorbs vibrations transmitted from the piano toward the supporting element (10). The form of the legs (12A), (12B) of the load-bearing section (12) is made unsymmetrical between right and left with respect to a point-supporting spot P in the same way as the supporting element (10) illustrated in FIGS. 1 and 2, to prevent resonance of the grand piano (1).

Figure 4:
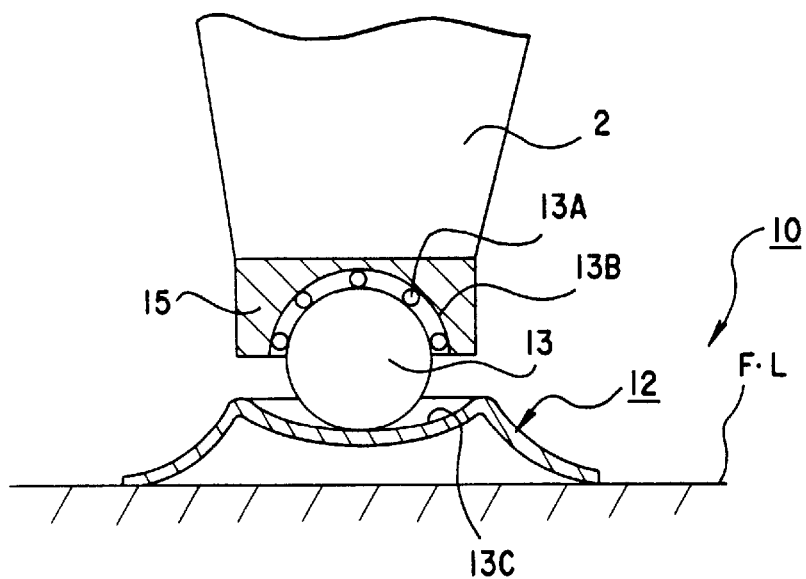
FIG. 4 is a front elevation view of the supporting element developed mainly for instruments without casters.

The third embodiment of the invention is shown in FIG. 4. In this embodiment, while keeping a certain separation L from the floor (F.L), a load-bearing section (12) made with elastically deformable dish-shaped board spring with a supporting point for the leg (2) of the piano (1) formed on the top end thereof, a steel ball (13) placed free to rotate on a receiving surface of a semi-spherical hollow (13C) formed on the top end surface of this load-bearing section (12), and a receiving part of the piano side (15) comprised of a semi-spherical receiving surface (13B) to hold this steel ball (13) from upside, namely from the side of the leg (2) of the piano (1), and a ball bearing (13A) mounted on this semi-spherical receiving surface (13B), all these three are combined together . Thereby, the point-supporting structure (10) that can adjust the center automatically is formed between the bottom end surface of the leg (2) of the piano (1) and the top end surface of the load-bearing section (12). The radius of curvature of the semi-spherical hollow (13C) is set to be much greater than the diameter of the steel ball (13) to keep freedom for the steel ball (13) to rotate.

Figure 5:
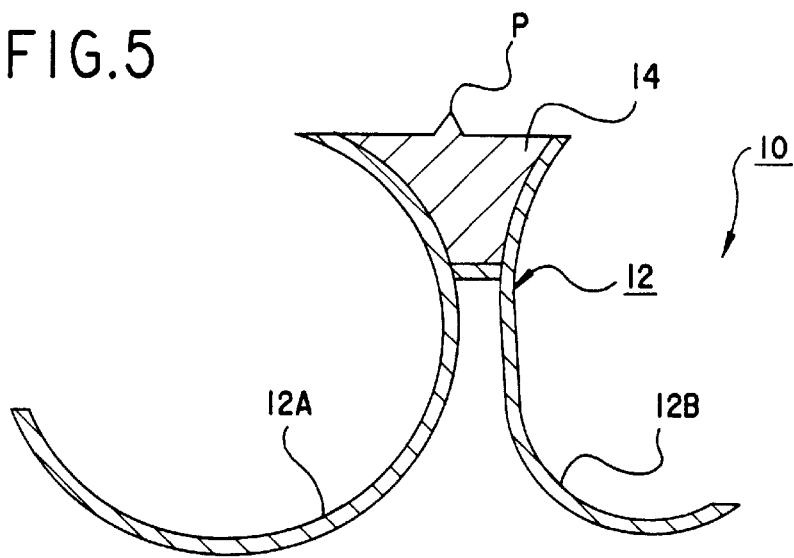
FIG. 5 is a longitudinal cross-sectional view of the supporting element with a sound quality modulation piece mounted on the top end.

The forth embodiment of the invention is shown in FIG. 5. In this embodiment, a sound quality modulation piece (14) that is made of a material selected among wood, rubber, plastic, and metal is fitted in the top end of the load-bearing section (12) illustrated in FIG. 1 to FIG. 3.

The sound quality modulation pieces (14) are made of plural kinds of material in advance so that the the can be exchanged for each other depending upon the combination with the material of the base plate (11) and the load-bearing section (12), the acoustic characteristics of the instrument (1) such as piano or the speaker (6), the change in the wall and ceiling of the concert hall or in the number and position of the resounding boards, and so on. And they are selected and used according to necessity. The point-supporting spot P is formed on the top end of the sound quality modulation piece (14).

The supporting elements (10) illustrated in FIGS. 1 to 5 lift up and support a piano (1) in a point-support state or a line-support state, separate the main body of the piano (1) including the legs (2) from the floor (F.L), and thereby keep the piano (1) free to vibrate in the vertical and horizontal directions.

The supporting elements (10) illustrated in FIGS. 6 to 10 have been fabricated as a supporting structure to lift up those instruments (1) placed directly on the floor such as speaker (6), organ, harpsichord and marimba, or those instruments (1) such as koto and harmonica with keyboard that are placed on the frame stand (18) and used by a player sitting on a chair.

Figure 6:
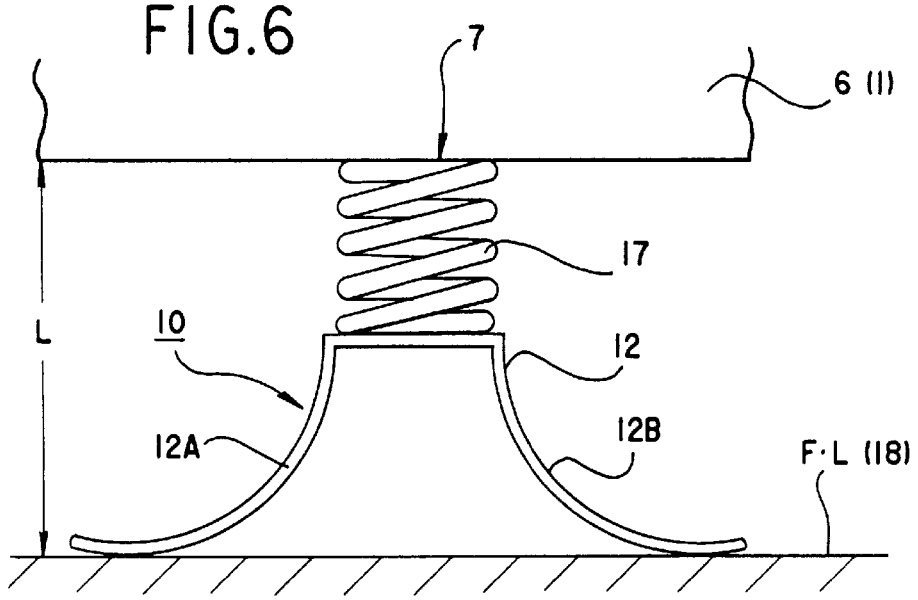
FIG. 6 is a front elevation view of the supporting element developed mainly for speakers or instruments placed directly on the floor.

The supporting element (10) illustrated in FIG. 6 is comprised of a load-bearing section (12) made with elastically deformable spring material and a coil spring of compression type (17) having a supporting surface formed on the top end thereof to support the instrument or speaker and bonded to the top end surface of the the load-bearing section (12). The both are combined together and placed between the floor (F.L) and the instrument (1) or speaker (6) while keeping a certain separation L. Thus, between the bottom end surface (7) of an instrument (1) or a speaker (6) and the top end surface of the load-bearing section (12) is placed a supporting structure of a line-contact type which deforms elastically to create an equilibrium state with the weight W of the instrument (1) or the speaker (6) upon loading and keeps the instrument (1) or the speaker (6) free to vibrate.

Hereinafter, some of the embodiments of the invention will be described based on FIG. 7 through FIG. 11.

Figure 7A:
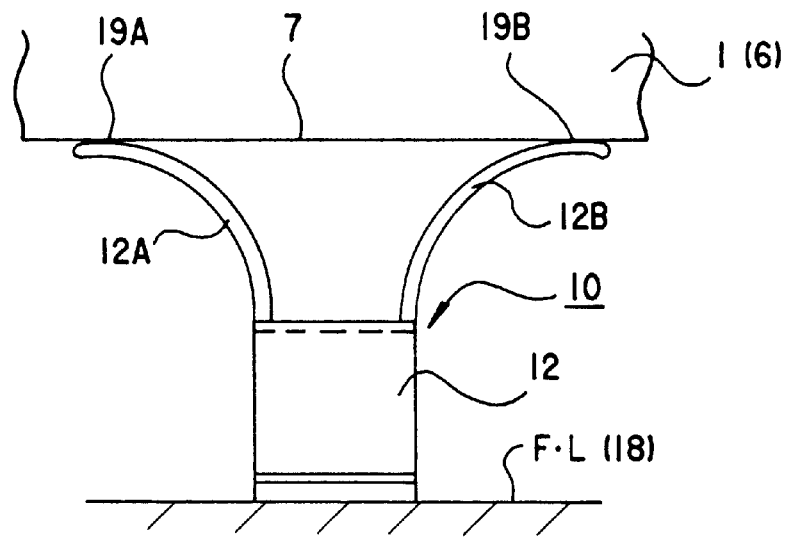
FIG. 7A is a front elevation view of the supporting element developed mainly for speakers, instruments placed directly on the floor or instruments used as being placed on the frame stand.
Figure 7B:
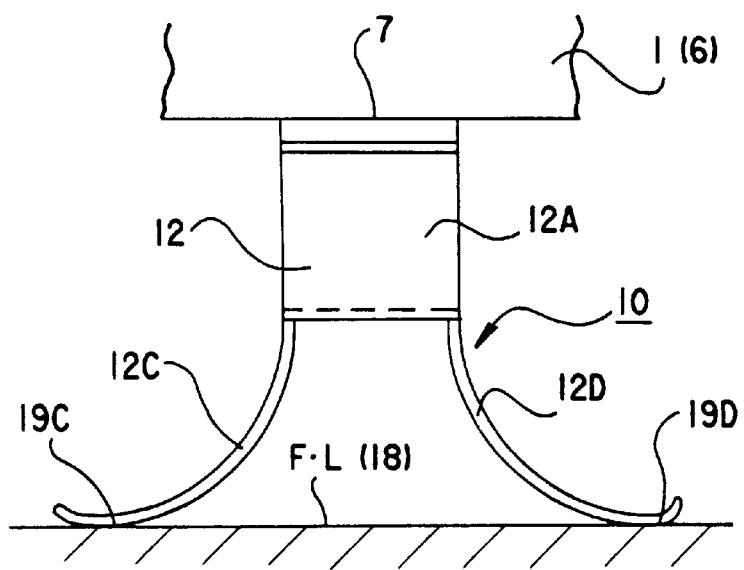
FIG. 7B is a side elevation view of the supporting element.

The supporting element (10) illustrated in FIG. 7 forms a supporting structure of line-contact type which is fabricated by giving roll processing to a thin plate of spring steel that is cut into a cross shape and comprised of four legs (12A and 12B of FIG. 7A) and (12C and 12D of FIG. 7B) extending radially at an angle of 90 degrees out of phase with each other, these legs being made to open outward, or upward, on the side of the instrument (1) or the speaker (6) and made to open outward, or downward, on the side of the floor (F.L) or the frame stand (18), so that it can deform elastically in the vertical and horizontal (back and forth, and right and left) directions to create an equilibrium state with the weight W of the instrument (1) or the speaker (6) upon loading. As a result, the state is created where two weight supporting lines (19A), (19B) formed on the side of the instrument (1) or the speaker (6) and two weight supporting lines (19C), (19D) formed on the floor (F.L) or the frame stand (18) cross each other at right angles. Accordingly, the harmful vibrations transmitted from the instrument (1) or the speaker (6), not only in the vertical direction but also in the horizontal direction, are effectively damped through absorption of these vibrations effected by elastic deformation of the legs (12A), (12B), (12C), (12D) in the back and forth, and right and left directions.

In the case of a supporting element (10) illustrated in FIG. 8, cut-in grooves (20) are made along the height direction from both the upper edge and the lower edge of a square thin plate of spring steel; four of the legs, (12A) (12B) (12C) (12D), situated outside of the cut-in grooves (20) and two of the legs,(12E) (12F), situated inside of the cut-in grooves (20) are curved in the opposite direction using a suitable processing means such as roll processing; and thereby, the supporting structure of a line-contact type which has, in all, 6 weight supporting lines (19A), (19B), (19C), (19D), (19E), (19F), three on the side of the instrument (1) or the speaker (6) and three on the side of the floor (F.L) or the frame stand (18), is formed.

As an alternative method, a supporting structure of line-contact type which has two weight supporting lines each on the top and the bottom end of the supporting element (10) may also be fabricated by putting together two thin plates of spring steel curved in C-shape, back to back with each other, and by welding the contact portion located in the middle along the confronting line of the two parts.

The supporting element (10) illustrated in FIG. 9, which is an applied example of the embodiment shown in FIG. 3, is fabricated by giving roll processing to an oblong board spring of stainless steel. In this embodiment, the base plate (11) is not attached so that the supporting element (10) can be used upside down, if necessary.

The supporting element (10) illustrated in FIG. 10 has been fabricated as a supporting structure to lift up an instrument such as koto (1) used by a player sitting on a chair. The height of the supporting surface of the frame stand (18) that supports a koto (1) is adjusted to the sitting position of the player. On the upper surface of the portion where a vertical frame (18B) and a horizontal frame (18A) of the frame stand (18) cross each other is mounted the supporting element (10) made with a thin plate of spring steel using a proper fixing means such as fitting-in. The first legs (12A), (12B) of the supporting element (10) that keep in contact with the side body of koto (1) and the second leg (12C) of the supporting element (10) that lifts up to support koto (1) are made warped convexly toward the body of koto (1) in the middle of their length direction by use of cut-in groove (20) processing and roll processing, so that the koto (1) placed on the frame stand (18) may not move and can be supported elastically keeping in line contact. Thereby, the aforethe legs are made to operate actively as absorbing parts to absorb vibrations transmitted from the koto (1), and three supporting parts of line contact type are formed for each crossing portion of a vertical frame (18B) and a horizontal frame (18A) of the frame stand (18). Because a set of two frame stands (18) are placed at the both ends of the koto (1), four elastic supporting parts on the horizontal frame (18A) of the frame stand (18) and eight on the side of the vertical frame (18B) thereof, namely, in all, twelve elastic supporting parts are formed for each set of frame stands (18).

As an alternative method, a supporting element (10) having a structure similar to the one shown in FIG. 10 can also be formed by preparing two thin plates of spring steel warped convexly in the middle, fixing their position with the convexly warped parts faced to the koto (1) side, and then welding to each other with their base parts confronted. As yet another method, a supporting element (10) having a structure similar to the one shown in FIG. 10 can also be formed by preparing an oblong thin plate of spring steel having a unified structure with two convexly warped parts side by side, and bending the thin plate of spring steel at the center between the two convexly warped parts at a bending angle of about 90 degrees in an L-shape so that the the convexly warped parts may come nearer to each other. But, since the number of legs made by cut-in groove processing, or in other words, the number of vibration-absorbing parts is not expected to increase in any case of the aforethe processing methods employed, two for each crossing portion of a vertical frame (18B) and a horizontal frame (18A) of the frame stand (18), and in all, eight vibration-absorbing parts are formed, as a whole, in the two frame stands (18) counter-placed as a set.

Figure 11A:
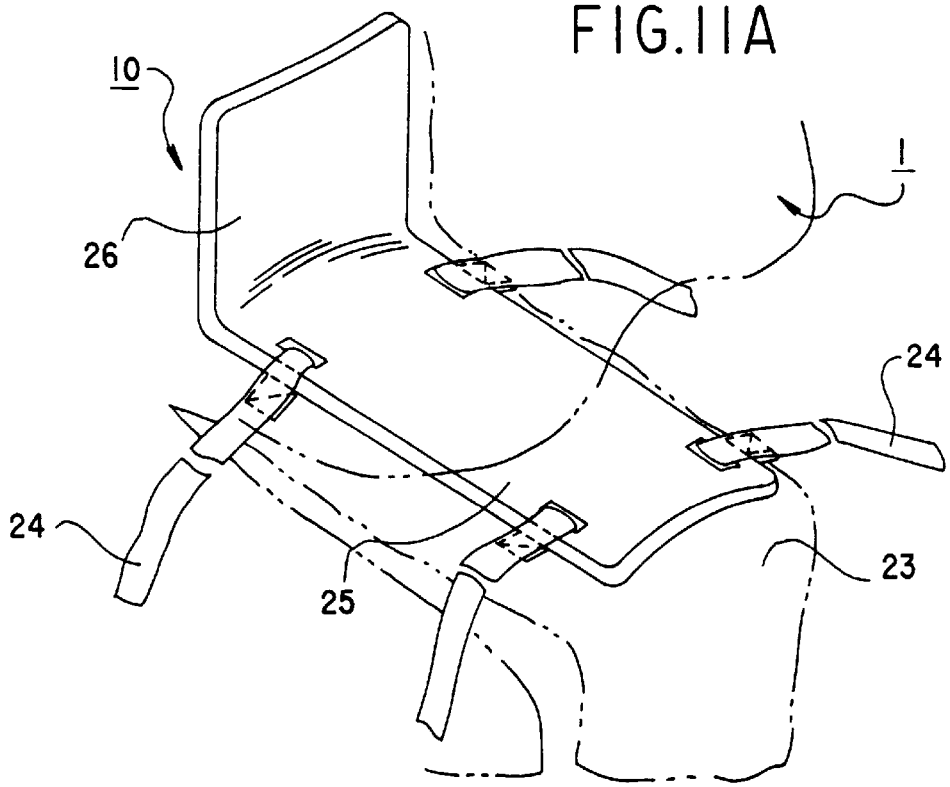
FIG. 11A is a perspective view of the supporting element developed for instruments used as being placed on lap (femur)

FIG. 11(A) shows a supporting element (10) developed as a means to improve the sound quality of an instrument (1) played on knee or, to be exact, on lap such as guitar and viola da gamba. This supporting element (10), being of lap-top type, is fabricated by giving bending processing to wooden materials, for example, thin plywood of maple under the action of steam heat for the purpose of imparting light weight. The supporting element (10) is comprised of a semi-cylindrical lap board (25) fixed to the player's lap (23) by use of fixing means known to the public such as string and band, and a back-face supporting board (26) which bends upward at the base end side of the lap board (25) and faces to the front of the player's abdomen. The guitar (1), when placed on the supporting element (10), is brought into point or line contact with the surface of the semi-cylindrically shaped lap board (25) and the back-face supporting board (26), and thereby, hindrance from free vibration of the instrument is removed and the effect to improve sound quality is enhanced. Though illustration is omitted, the holding position (height) of an instrument, for example, a guitar (1), can be adjusted by changing the curving dimension of the lap board (25) along the length of lap (23) with the height dimension of the lap board.

Figure 11B:
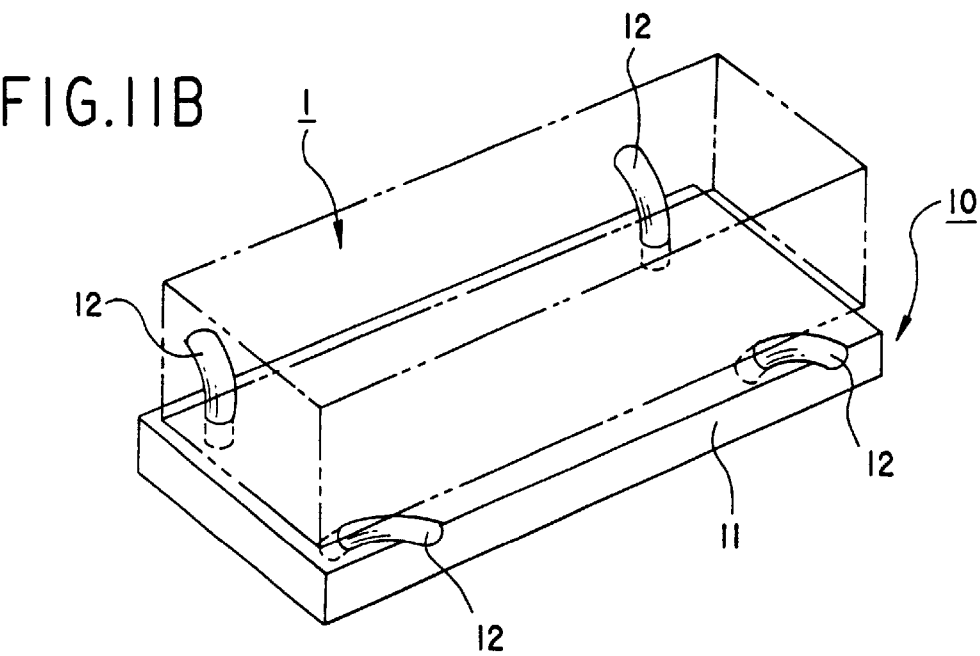
FIG. 11B is a perspective view of the supporting element developed for instruments used by a player sitting on a chair.

FIG. 11(B) shows one embodiment of the supporting element (10) developed for an instrument (1) used by a player sitting on a chair, for example, harmonica with keyboard (portable organ). This supporting element (10) forms a supporting structure of four-point support type by fitting in and fixing the base part of an elastically deformable metallic rod spring (12) at the corners of the top surface of the base plate (11), the upper part of the rod spring (12) sticking out of the base plate (11) and being curved outward perpendicular to the axial line of the length direction of the base plate (11).

Figure 12:
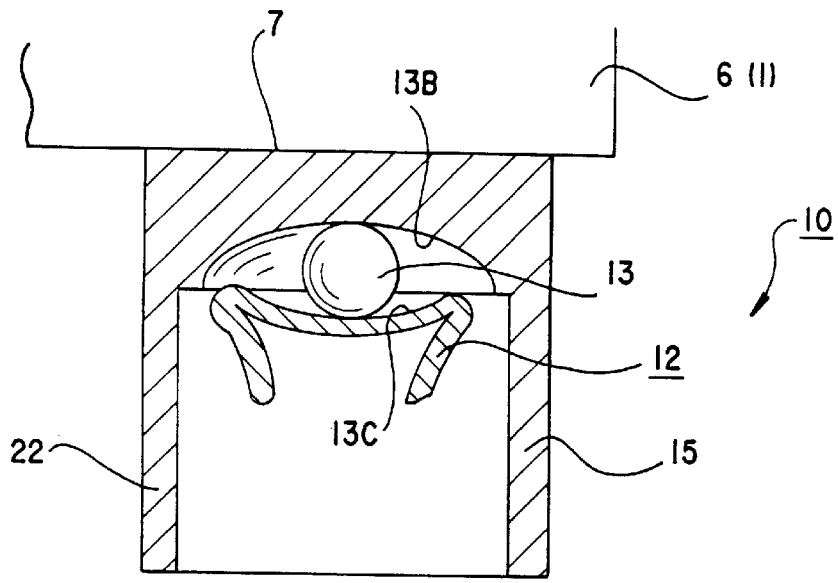
FIG. 12 is a partial longitudinal cross-sectional view of the supporting element developed mainly for speakers or instruments placed directly on the floor.

The supporting element (10) illustrated in FIG. 12, as well as the one illustrated in FIG. 6, is fabricated as a supporting structure to lift up a speaker (6) or instruments (1) such as organ, cembalo, and marimba that are placed directly on the floor. The supporting element (10) forms a point-supporting structure which can adjust the center automatically placed between the bottom end of an instrument (1) or a speaker (6) and the load-bearing section (12), keeping a certain separation L from the floor (F.L), wherein are combined the three parts: firstly a load-bearing section (12) made with elastically deformable board spring having a semi-spherical hollow (13C) formed on its top end to point-support a speaker (6) or such instruments (1) as placed directly on the floor mentioned above; secondly a steel ball (13) placed free to rotate on a load receiving surface (13C) of semi-spherical hollow formed on the top surface of this load-bearing section (12); and thirdly a receiving part (22) on the side of the instrument (1) or the speaker (6) having a load receiving surface (13B) of semi-spherical hollow for the steel ball (13) to fit in formed on the back surface of the top board of a cylindrical body with an opening at the bottom. As in the supporting element (10) illustrated in FIG. 4, the radii of curvature of load receiving surfaces (13B) (13C) are designed to be much greater than the diameter of the steel ball (13), and thereby the steel ball (13) is kept free to rotate and thus the instrument (1) or the speaker (6) is kept free to vibrate both in the vertical direction and in the horizontal direction.

The vibrational direction of sound waves is improved by separating the main body of an instrument (1) or a speaker (6) for a certain distance L from the floor (F.L) or the frame stand and keeping the load-bearing condition close to a point-support or line-support condition. The instrument (1) or the speaker (6) is kept free to vibrate in the vertical and horizontal directions by incorporating into the supporting element (10) a load-bearing section (12) made with elastically deformable spring material and making the arc-shaped curved legs of this load-bearing section (12) operate as absorbing parts of both longitudinal and lateral vibrations transmitted from the instrument (1) or the speaker (6). More specifically, as compared with the case wherein a load-bearing section is made with rigid material, the function of a supporting element to absorb vibrations is even more enhanced by making the legs of the load-bearing section (12) made with spring materials operate as absorbing parts of vibrations not only in the back and forth and right and left (horizontal) directions but also in the vertical direction. As a result, the difference in amplitude or period between sound waves directly transmitted from an instrument (1) or a speaker (6) to the air and sound waves transmitted from the bottom end of the legs (2) of the instrument (1) or the speaker (6) by way of the floor (F.L) or the frame stand (18) and thereafter to the air is reduced. At the same time, the distortion of sounds transmitted from the floor (F.L) or the frame stand (18) is greatly reduced, and thereby, the disturbance of waveforms of sound vibration is reduced, and improvement in the direction of sound transmittance and close reproduction of sound quality are made possible.

Besides, when the material and the form of a sound quality modulation piece (14) and a load-bearing section (12) are properly chosen in accordance with sound quality required, a marked effect will be exhibited on improvement of sound quality and regulation of sound volume. By use of the load-bearing section made with spring material, the manufacturing process steps are reduced in number and a marked effect on cost reduction is also exhibited as compared with the case wherein a supporting element (10) is manufactured by shaving processing.

What is claimed is:

1. A supporting element usable with an instrument or a speaker located on a floor, the supporting element comprising: a load-bearing section having a bridge frame with a supporting point formed on a top surface of the bridge frame to support the instrument or the speaker, and arc-shaped legs extending from the bridge frame positioned on a base plate, said legs form an absorbing part that absorbs vibrations transmitted from the instrument or the speaker, wherein the bridge frame and arc-shaped lens are made with elastically deformable spring material.

2. A supporting element for instruments or speakers as set forth in claim 1, wherein the load-bearing section is made with elastically deformable board spring or rod spring, the material thereof being chosen from the group comprising metal, fiber-reinforced resin, plastics, and wood.

* * * * *